United States Patent
Baker et al.

(10) Patent No.: US 8,180,862 B2
(45) Date of Patent: May 15, 2012

(54) ARRANGEMENTS FOR AUTO-MERGING PROCESSING COMPONENTS

(75) Inventors: Marcus A. Baker, Apex, NC (US);
Marlene J. Gillingham, Bellevue, WA (US); Mark V. Kapoor, Durham, NC (US); Sheldon J. Sigrist, Cary, NC (US); Karen A. Taylor, Cary, NC (US); Steven J. Zaharias, Issaquah, WA (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 11/847,568

(22) Filed: Aug. 30, 2007

(65) Prior Publication Data
US 2009/0063662 A1    Mar. 5, 2009

(51) Int. Cl.
*G06F 15/177*    (2006.01)
(52) U.S. Cl. ........ 709/220; 709/201; 709/202; 709/221; 709/222
(58) Field of Classification Search .................. 709/220
See application file for complete search history.

(56) References Cited

U.S. PATENT DOCUMENTS

| | | | | |
|---|---|---|---|---|
| 5,522,075 | A * | 5/1996 | Robinson et al. | 718/100 |
| 5,640,546 | A | 6/1997 | Gopinath et al. | |
| 6,263,387 | B1 * | 7/2001 | Chrabaszcz | 709/220 |
| 6,597,956 | B1 * | 7/2003 | Aziz et al. | 709/209 |
| 6,895,443 | B2 * | 5/2005 | Aiken | 709/217 |
| 6,976,068 | B2 * | 12/2005 | Kadam et al. | 709/220 |
| 2002/0038360 | A1 | 3/2002 | Andrews et al. | |
| 2003/0018870 | A1 * | 1/2003 | Abboud et al. | 711/173 |
| 2004/0264422 | A1 * | 12/2004 | Calcev et al. | 370/338 |
| 2005/0229173 | A1 * | 10/2005 | Mihm et al. | 717/171 |
| 2006/0010133 | A1 | 1/2006 | Bozek et al. | |

* cited by examiner

*Primary Examiner* — Dohm Chankong
*Assistant Examiner* — Neeraj Utreja
(74) *Attorney, Agent, or Firm* — Thomas E. Tyson; Schubert Law Group PLLC

(57) ABSTRACT

In some embodiments, a method for auto-configuring a network is disclosed. The method can include communicating with at least one node in a processing complex, receiving node connection data from the at least one node querying a node to verify at least a portion of the node connection data, and auto-configuring system partitioning in response to the node connection data. In some embodiments, the method can also include verifying the node connection data by transmitting a request for a universally unique identifier and a node identifier. The node identifier can be associated with the universally unique identifier. The node identifier can be utilized in data transmitted between nodes.

18 Claims, 3 Drawing Sheets

|  |  | NODE A || NODE B || NODE C || NODE D ||
|---|---|---|---|---|---|---|---|---|---|
|  |  | P1 | P2 | P1 | P2 | P1 | P2 | P1 | P2 |
| NODE A 00 | P1 | N | N |  | 01 |  |  |  |  |
|  | P2 | N | N |  |  | 02 |  |  |  |
| NODE B 01 | P1 |  | 07 | N | N |  |  | 04 |  |
|  | P2 |  |  | N | N |  |  |  | 05 |
| NODE C 10 | P1 |  |  | 03 |  | N | N |  |  |
|  | P2 |  |  |  |  | N | N |  |  |
| NODE D 11 | P1 |  | 06 |  |  |  |  | N | N |
|  | P2 |  |  |  |  |  |  | N | N |

FIG. 2

ARRANGEMENTS FOR AUTO-MERGING PROCESSING COMPONENTS

FIELD

The present disclosure relates generally to computing systems and more particularly to auto-configuring a scalable computing system.

BACKGROUND

As computing needs for organizations have increased, and as organizations plan for growth, one common way to plan for, and obtain economical computing is to purchase computing systems that are scalable. A system or architecture is scalable when it can be upgraded or increased in size or reconfigured to accommodate changing conditions. For example, a company that plans to set up a client/server network may want to have a system that not only works with the number of people who will immediately use the system, can be easily and economically expanded to accommodate the number of employees who may be using the system in one year, five years, or ten years. In another example, a company that runs a server farm and hosts web pages or applications via the Internet may continue to grow, and this company would desire a scalable system where they can economically add servers as needed to accommodate growth and can re-partition as needed.

Accordingly a scalable system can typically merge or integrate a number of scalable servers or chassis having one or more processors to create a "larger" unitary system having processing nodes. Thus, a collection of scalable servers can function like a single larger server when properly merged. Although multiple servers are merged they can also be partitioned using hardware partitioning. A system with a single partition can run a single instance of an operating system (OS) and all the nodes of the system are thus conceptually combined. Thus, in effect the user will experience a single, more powerful computing system functioning as one "scaled up" node, instead of a number of less powerful nodes running independently.

A traditional approach to combining multiple nodes of a system into a single-partition merged system running a single instance of an OS is to have a trained technician manually integrate and configure each node as a system is built or as computing resources (nodes) are added. Traditionally, a trained technician or administrator must configure each node with the proper partition configuration information, specifying one of the nodes as the primary, or boot node, and the other nodes as secondary nodes to the primary node. This approach is cumbersome, and requires trained technicians to build and configure such a system. When there are more than a few nodes to manually configure, configuring can get complex and such configuring is prone to connection and configuration errors and omissions.

Another approach is to have dedicated hardware that is responsible for configuring the nodes as a single-partition merged system running a single instance of an OS. In this approach an administrator can interact with the dedicated hardware, which may be, for example, a dedicated management console. The dedicated hardware can be responsible for ensuring that the nodes operate as a single-partition merged system. It can be appreciated that this approach requires costly dedicated hardware, and may require modification to preexisting systems that do not allow for the addition of such functionality.

Power up for a scalable system also can create difficulties. One approach to address this issue is to have a "luck-of-the-draw" or timing-based approach programmed into the nodes of the system. When a node boots up, it can determines whether a single-partition merged system is already running, and if so, join the system. If the node does not find a preexisting system to join, it starts one, and becomes the primary node for the new system. The node thus becomes the primary node due to timing issues and the luck of the draw. Such an approach, however, can be complex, and does not provide the administrator with control over which node becomes the primary node. Generally, systems in a scalable environment don't automatically know that they are cabled together and can work as one system. These scalable systems have to be told (i.e. configured by technician) such that they know that they are cabled to other nodes and must be configured regarding how they can communicate with other nodes. There are many current designs available that utilize this manual configuration approach. One design uses a network such as an Ethernet connection between nodes and utilizes a Remote Supervisor Adapter (RSA) to facilitate set up of the system.

The RSAs can communicate with each other on Ethernet (embedded service on each RSA) and can instruct the scalable components to work together with a set partitioning. This system, among other things, requires a user to input the Internet Protocol (IP) addresses of each RSA in the RSA interface before the scalable systems can work as a single entity. This process can be cumbersome for a user to discover and enter the RSA IP address for each component. This IP detection process can include booting each scalable component and after the component is connected to the network the user can request and find the IP address in the BIOS menu of the component. Another traditional arrangement uses a Service Location Protocol (SLP) discovery routine to detect all scalable components via the system's RSA Ethernet network connections. Then the arrangement can iterate through the list of SLP scalable systems and an application can send a message (ping) through each scalable system port and detect received messages on another scalable system port. Each scalable system relies on RSA Ethernet protocol to initiate and detect how other scalable systems interconnect. In the end, all scalable connections are determined for all SLP scalable systems.

This Ethernet based arrangement does not get comprehensive system information and such a detection depends on intercommunication of scalable components via RSA Ethernet. This solution uses SLP to discover the communication mechanism, which can find a large number of systems. Only the number of RSAs connected to that network limits the number of discovered systems. Often not all of these detected systems can be operate as a single identity. This can cause extra time filtering through the systems not capable of scalability.

Another approach is to connect the servers and configure virtual building blocks. These building blocks can be broken down to any level, but this is only supported in a Linux environment. Traditional systems require intensive user configuring the system utilizing a remote service administrator (RSA). Traditional systems utilize a relatively complex set-up. Such as set up can also require extensive hardware and software overhead. For example, such a system can require an Ethernet communication system to communicate set up commands to all of the subsystems. Further, it is expensive to require a trained technician be present at every installation or every system expansion.

SUMMARY OF THE INVENTION

The problems identified above are in large part addressed by the systems, arrangements, methods and media disclosed herein to provide auto-configuring of a multi-node processing system. In some embodiments the method can include communicating with at least one node in a processing complex, receiving node connection data from the at least one node querying a node to verify at least a portion of the node connection data and auto-configuring system partitioning in response to the node connection data. In some embodiments the method can also include verifying the node connection data by transmitting a request for a universally unique identifier and a node identifier. The node identifier can be associated with the universally unique identifier. The node identifier can be utilized in data transmitted between nodes.

In some embodiments an apparatus is disclosed that has a first processing component, a first communication port coupled to the first processing component and a baseboard management controller coupled to the first communication port. The baseboard management controller can query other baseboard management controllers regarding existing connection data and query other communication ports to self discover connection data. The apparatus can also include a sorter to sort the connection data such that all apparatus that make up a system can sort a table in a similar way. The system can also include a compare module to compare the self discover connection data with the existing connection data.

In yet another embodiment a computer program product is disclosed that has a computer useable medium with a computer readable program. The computer readable program when executed on computer causes the computer to communicate with at least one node in a processing complex, receive node connection data from the at least one node query a node to verify at least a portion of the node connection data, and configure system partitioning in response to the node connection data.

BRIEF DESCRIPTION OF THE DRAWINGS

Aspects of the invention will become apparent upon reading the following detailed description and upon reference to the accompanying drawings in which, like references may indicate similar elements:

FIG. 2 is a table representing how nodes can be identified and connected.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Disclosed herein is an auto-configuring scalable processing system having nodes that can are auto-merged to form a larger system that operates as a single entity. The merging of multiple nodes into a single-partition (unitary) system can be accomplished via a baseboard management controller (BMC) at each node. In some embodiments the resources or merged nodes of the processing system or complex can be partitioned to run a single instance of an operating system (OS), and in other embodiments the complex can be partitioned to run multiple instances of an operating system.

Figure 1:
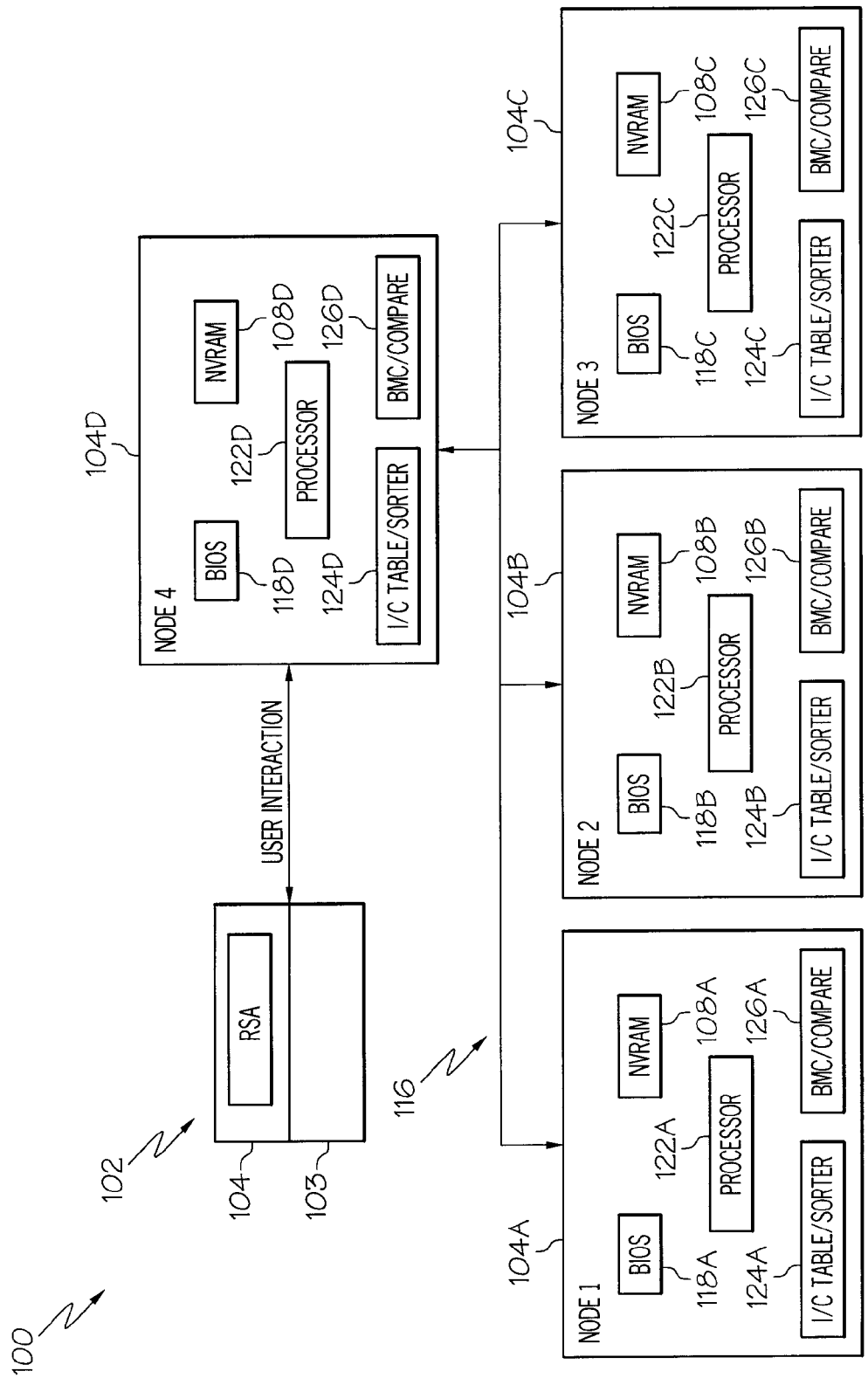
FIG. 1 is a block diagram of an auto-configuring merged system having a number of nodes.

Referring to FIG. 1 an auto-merging processing system 100 is disclosed. In some embodiments, the components of the system 100 can be cabled together and connected to a power source, and the system 100 can seamlessly integrate itself into a single partition system without user intervention. In some embodiments, additional computing resources can be connected when the system is operating, and the system can integrate or merge a newly/hot connected node "on the fly." In this auto-merging/auto-configuring process, the system 100 can set up as a single-partition system that runs a single instance of an operating system (OS), (hence referred to as a single partition). The system 100 can include many nodes, such as nodes 104A, 104B 104C and 104D (referred to herein collectively as nodes 104) as where each node can be a processing resource such as a scalable server. However, this disclosure is not limited to any fixed number of nodes or any type of processing resource. Thus, nodes 104 can represent any resource that can be scaled.

As can be appreciated, the nodes 104 may include other components in addition to and/or in lieu of those depicted. Furthermore, nodes 104 are meant as representative of one type of node in conjunction with which embodiments can be implemented. Embodiments of the system are also amenable to implementation in conjunction with other types of nodes, as can be appreciated.

The nodes 104 can be coupled to one another via an interconnect system 116. The interconnect system 116 can be implemented via cabling where cables are plugged into "scalable ports" in the chassis or circuit boards of the nodes 104. A node 104 can send and receive set up information and commands from other nodes 104 via interconnect 116. The nodes 104, possibly servers, may physically be located within a single rack or the servers could be distributed over different server racks at various locations within the range of the interconnect system. Each node 104 can include a basic input/output system (BIOS) 118A, 118B, 118C, and 118D (collectively as BIOS 118); non-volatile random-access memory (NVRAM) 108A, 108B, 108C, and 108D (collectively as NVRAM 108); and a baseboard management controllers (BMCs) 126A, 126B, 126C, and 126D (collectively as BMCs 126). The nodes 104 may also include components in addition to and/or in lieu of those depicted. For example, the BMCs 126 can have a compare module to compare self discovered connections to data in the table 124.

A system owner, user, or system administrator can connect an input/output device such as a remote service administrator (RSA) 102 to the nodes 104 to monitor configurations of the nodes 104 and of the system and possibly configure the system 100 or nodes 104 if needed. The RSA 102 can have a keyboard 103 and a display 104 and can be connected to any node 104 or to a portion of the interconnect 116. Via the RSA 102, the user can interact directly with the BMCs 126 and interact with the BIOS 118 and BIOS setup/start up instructions 118 of each node 104 if desired. The BIOS 118 may be a set of instructions or routines that allows each node 104 to load instructions that dictate basic operating functions and the BIOS 118 can provide an interface between the operating system (OS) and the hardware, and can control at least some of the functionality each node 104 and the system 100.

For example, the BIOS 118 can control a power-on self test (POST), a node interconnect detection system, and can read partition configuration information from the BMCs 126 and reconfigure itself in preparation for partition merging. The BIOS 118 can control the above mentioned functionality and additional functionalities and can operate at each mergable node 104. The NVRAM 108 can retain the BIOS 118 contents even when power is not supplied to the node 104. The NVRAM 108 can also store the firmware for the processors 122A, 122B, 122C, and 122D (collectively as processors 122). The processors 122 can be a single processor, a series of processors, or a multi-core processor.

As stated above each BMCs 126 can act as facilitators of the auto-merging/auto-configuring process and can interact with the BIOS 118 of each node. In some embodiments, the nodes 104 can be connected by cables, including power cables and then, without user intervention, the BMCs 126 can automatically discover what connections exist and each BMC 126 can configure the operation of their respective node 104 such that the system 100 boots and operates as a unitary/single partition system. The system 100 can auto-configure in a "similar" way to what is referred to as a "plug and play" system in personal computer (PC) technology. Plug and play systems configure newly connected devices with code that is part of an operating system where the disclosed arrangement are not part of an operating system but are performed on a software layer that underlies the operating system.

Thus, the operation and actions of auto-merge system 100 is virtually transparent to the operating system, as different operating systems could operate on the system 100 without affecting the system 100 configurations settings such as the partitioning. The BMCs 126 can provide an interface mechanism for automatic recognition of connections for all nodes 104 for addressing each node 104. This interface feature can provide the capability of transmitting or receiving partition configuration data and for dispersing the processing workload presented to the system 100. The BMCs 126 can also control the turn on, or turn off of various portions of the merged system 100, and the BMCs 126 can reset the processors 122 within the merged system 100.

As part of the auto-configuration process, each BMC 126 can perform an automated self-discovery for the presence of connected nodes 104 and each port of each node 104. During this connection discovery process the BMCs 126 can create a connection matrix or connection table 124 representing the interconnection of the system 100. This self discovery process can commence when power is connected to the nodes 104 even though the power switch is not turned on. The BMCs 226 can conduct a "system self discovery" by automatically mapping the interconnect configuration when power is applied to each node 104 even though the power switch is in an off state. Such a mapping configuration can be stored in the form of interconnect (I/C) tables 124A, 124B, 124C, and 124D (collectively tables 124). The tables 124 can also have a sorter module such that the connection data entered into each table can be sorted the same according to a hierarchy. Further, after the mapping is complete, the BMCs 126 can configure the system 100 as a unitary or single partitioned system according to a default setting. In other embodiments, a default setting or a user configured setting can create multiple partitions.

In some embodiments, the self configuring/self merging system 100 does not require the user to input any values or provide any configuration data. The nodes 104 can communicate and exchange connection information and can configure a shared processing configuration and an addressing scheme such that the system 100 can operate as a homogenous system. It can be appreciated that this sub-OS plug and play arrangement can operate with many different operating systems as the self configuring set up can run "under" or transparently to whatever operating system is installed on the system 100. Thus, this sub-OS plug and play system provides a user friendly, hands off solution to scalable system management of nodes.

As stated above, the system 100 can automatically configure cabled nodes 104 where multiple nodes can create a system 100 that appears to operate or work as a single system or single unit. The system 100 can assign unique identifiers to each port of each node such that each table of the tables 124 is identical. From the factory each component (that is connected as a node) can have a universally unique sixteen byte identifier. The BMC 126 can get the identifier by querying the node or port and organize the table 124 in a hierarchy according to the numeric, alpha or alpha numeric magnitude of the identifier. Thus, all the tables 124 generated should have the same components in the same order. The interconnect data can be codified in a table format. Since a unique sixteen byte identifier has more bits than are needed for addressing communications between the small number of ports or nodes of the system 100, after the tables 124 are generated, each node can be assigned an index (possibly a four bit unique identifier), the index could start at "00" counting up, and the last node (component with the highest or lowest factory assigned identifier) could have an "03" index if four nodes are present in the system 100. In some embodiments, eight or more nodes can be accommodated.

This unique index can be utilized as an address and allow all of the scalable sub-components or nodes 104 to communicate with each other by using the index/address in a header of transmissions. Each node of the nodes 104 of the scalable systems can determine and generate a table where each sub-component should, when connected and operating properly, build or create the same table during the connection discovery process. Thus, because the nodes 104 can order the hardware in the same manner and assign consecutive numbers to the ordered hardware, identical tables 124 can be generated. When tables 124 are not substantially identical, the BMCs 126 can recognize this and can regenerate the tables until all BMCs 126 generate an "identical" table.

In some embodiments, when power is initially applied to a node 104 (with the power switch off), the BMC 126 can perform a software load from non-volatile memory and can conduct a self test by executing the BMC code 126. After a successful self test, each BMC 126 can initiate a self-configuration procedure or routine. Each BMC 126 can query other BMCs and check for the presence of descriptors of connections (populated tables) via scalable interconnections with other nodes. The BMCs 126 can also monitor communications and by reading addressing or header information can detect connection descriptors. The descriptors can indicate that other BMCs 126 in the system 100 are already cabled together and communicating. If descriptors are detected during the initialization communications, the BMCs 124 can begin a self-configuration process to verify the integrity of the descriptors. In some embodiments, the BMCs 124 can check to make sure its nodes are connected to ports of other nodes and that the descriptors match what is indicated by the detected descriptors.

If a port is unreachable or no connection is found, the port can be flagged as an un-operable or unconnected port. If there is a mismatch between the complex descriptor and the system connected to the local port, the system can proceed to conduct a self-configuration as described below. When all BMCs 124 determine that they have matching tables then system partition management may begin. A complex self-configuration can be performed by each of the BMCs 124 to create the complex descriptor when the system is initially configured or when a connection is added or changed. Each of the nodes 104 can query all the nodes connected directly to their ports and can update a local copy of the complex descriptor with the discovered unique identifier.

In some embodiments, each of the BMCs 126 can perform a "one hop" port query on ports that are "indirectly" connected to the BMCs 126. By querying beyond the directly coupled ports, BMCs 126 can capture remaining unique identifiers for any other nodes in the system 100 or complex. This hopping inquiry process can produce a complete list of available systems for the complex where each of the nodes 104 is identified by the unique identifier.

Each of the nodes 104 can sort the list of unique identifiers in the complex descriptor. The index number into the sorted unique identifier list can become a unique node number that the nodes use to communicate with specific nodes 104 of the system 100. Each of the nodes 104 can search tables 124 for its unique identifier (index) and can assign its own node number to the index of the entry. The node number is sufficient for any node to communicate with any other node in the interconnected complex. Partition IDs can then be assigned to groups of nodes in the complex so that power control is coordinated within the partition group, thus permitting the partition to boot as a single OS. In some embodiments, the BMCs 126 can assign a special value of (0xFF in hexadecimal) as a partition ID such that a communication can be sent to any node in the system 100. Each of the BMCs 126 can verify the complex descriptor by sending the local port connections to all the other BMCs 126. Such sharing of information can ensure consistency in table data.

As stated above traditional scalable systems can require an Ethernet connection at each node and can require a processing subsystem to configure system operation and to perform basic administrative functions. The disclosed embodiments with multiple scaled servers can perform without a centralized administrative system such as an RSA. Functions that formerly where performed by trained technicians utilizing RSAs can be automated by the BMCs 126. For example, node IDs do not need to be generated, entered into the system, and monitored by a trained technician at a RSA terminal. The disclosed system can automatically generate node IDs and provide continuous communication regarding the configuration of neighboring scalable nodes or systems.

A processing complex (a conceptual whole made up of related subsystems) can be considered as the set of scalable sub-systems cabled together where multiple servers can be auto-configured and run one or more operating systems. Alternately described, the server complex shown can have one or more partitions or run as one or more system. The system can utilize a "complex" descriptor to administrate the auto-connection and auto-configuring of the complex/system. The complex descriptor can be a data structure that describes each node of the scalable systems capabilities and how each node is connected.

In some embodiments, the system can automatically partition itself utilizing a single partition default setting. A partition can be considered as a group of the scalable systems cabled together and configured to run a single entity. For example, a scaled system having multiple nodes can run a single operating system.

Referring to FIG. 2, a table 200 of possible system interconnections that can be generated by a BMC is illustrated. Each component connected as a node or that can be connected as a node can have a factory assigned unique sixteen byte identifier. The component can transmit this identifier in response to query's transmitted from other BMC or components and all BMCs can store these unique identifiers and sort them from high to low or low to high. Accordingly, each BMC can organize the table 200 in the same order (i.e. from highest identifier value to lowest identifier value or lowest identifier at the top of the table and the highest valued identifiers at the bottom of the table).

This can be referred to as a sorting, rating, or ranking process. Using this hierarchy, each table created by each BMC can be substantially identical and should have substantially identical data. In the table 200 provided, a four node interconnect illustrates where each node has two ports identified as P1 and P2.

In the table 200, N's are placed to indicate that this embodiment does not couple ports at the same node together although this could be done. In the table 200, node A has been assigned a unique identifier 00, node B 01, node C 10, and node D 11. Such identifiers could be utilized for addressing of communications. In addition, the unique connections between ports have been assigned a unique identifier. For example, the connection between node B port 2 and Node A port 2 has been assigned the unique identifier "07." As stated above, each BMC can access the tables stored by other BMC to check specific connections or to compare every piece of data in one table to every piece of data in another table. Many other table configurations could be utilized without parting from the scope of this disclosure.

Further, as additional nodes are added to the system, the connections of the newly connected components or nodes can be automatically detected by all BMCs and the BMCs can configure/reconfigure the table 200 and the BIOS of all connected nodes such that they can function as one system. Thus, each node can automatically reconfigure, when a new node is added such that the newly connected resource can automatically and seamlessly integrate with existing operating resources. Scalability cables can be hot plugged, so that servers can be introduced into the complex and automatically detected while other systems are operational. The disclosed arrangements can also allow scalable server components to discover how to communicate with the other scalable systems without the requirement for the functions traditionally provided by a processing sub-system that configures according to user input.

As stated above, traditional systems utilize a relatively complex and overhead intensive Ethernet connection to communicate set up information. Further, traditional systems require significant user input or user assistance to configure the system and make it operable. Generally, the disclosed scalable system is not limited by any particular operating system because the auto-merging can be performed transparently to the OS allowing the system to run many different operating systems.

The disclosed system can avoid the need to "check" through systems that cannot be scaled, such as those that appear through SLP discovery. A monitor for the system is not required, however if someone wants to view system settings a monitor can be connected to the system. In addition, the systems and methods can free up Ethernet connections for other purposes and uses because only one node needs a terminal when someone wants to view how the system is set up every node. The system does not need a smart terminal such as a RSA and does not need an Ethernet connection to communicate system configuration data.

Each scalable node can communicate with all the other scalable nodes through designated ports and cabling to build and populate the table. In some embodiments, the BMCs can provide management functions for the nodes and create control settings based on the contents of the table. To facilitate communication between the scaled nodes, the BMCs can create, assign, and coordinate a unique identifier to each node and each port as shown at the left margin of the table. Such unique identifiers allow specific commands to be sent to specific systems and different commands to be sent to the different nodes. When a message is sent across the cabling, the nodes in the scalable system can know the intended recipient of the message by receiving the unique identifier and index (aka node ID) using the table 200 and by comparing the received identifiers to an identifier stored locally in the table 200.

Figure 3:
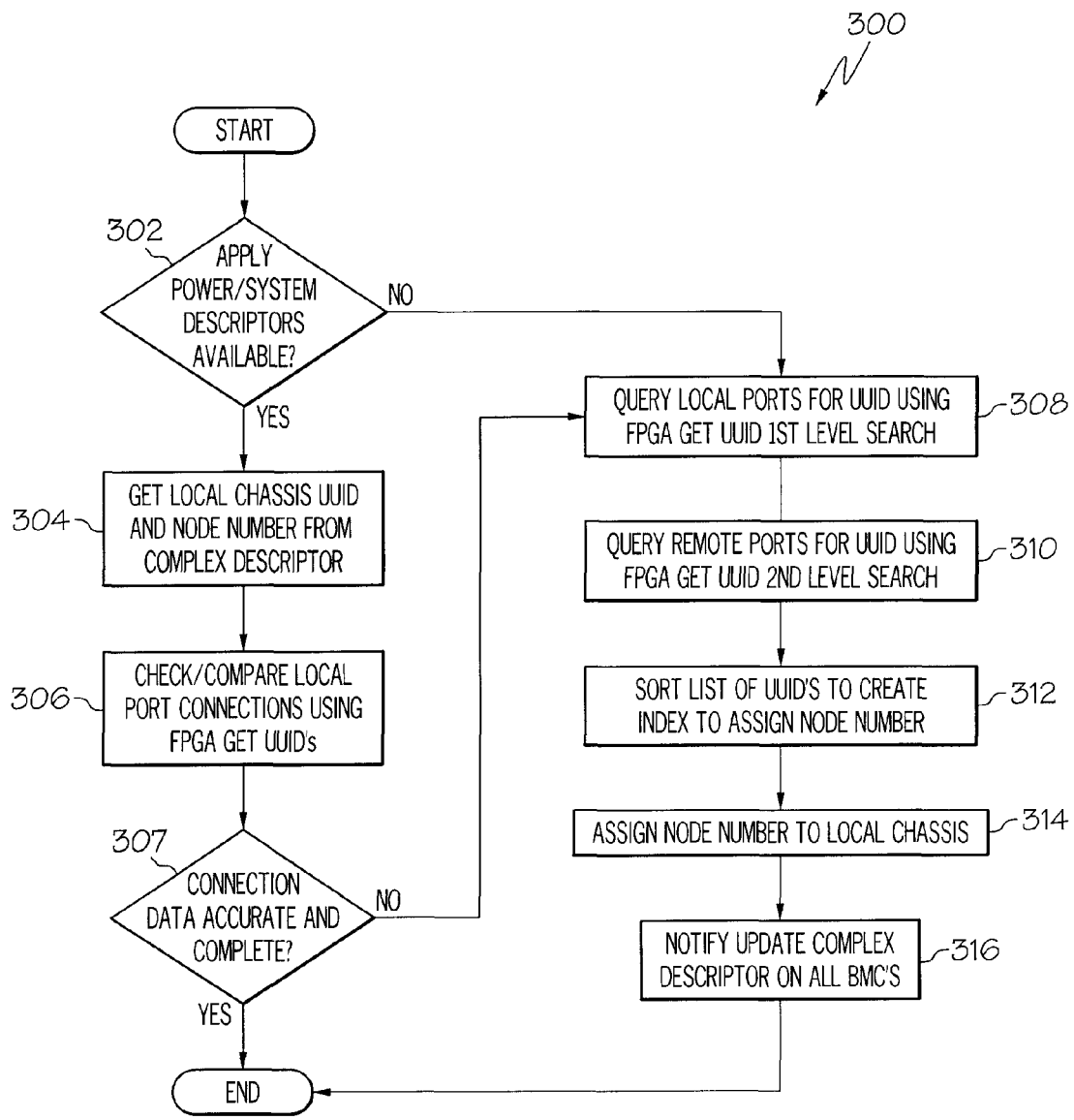
FIG. 3 is a flow diagram of a method of auto-configuring a system.

Referring to FIG. 3, a flow diagram 300 of a method of configuring a scalable processing system or complex is disclosed. The method disclosed, as well as other methods of embodiments of the disclosure, may be wholly or partially implemented in conjunction with a computer-readable medium on an article of manufacture. The computer-readable medium may be a recordable data storage medium, a modulated carrier signal, or another type of computer-readable medium. As illustrated by block 302, power can be applied to the system (with the power switch off) and during this interval, a baseboard management controller (BMC) can perform a software load from non-volatile memory and can conduct a self test and check to see if system descriptors are present in communications or in tables stored at nodes. As stated above, checking for connection data can be part of a discovery/self-configuration procedure or routine.

The descriptors of the processing complex can describe if other BMCs in the complex are already cabled together, partitioned, and communicating. If connection data is available then as illustrated by block 304, the BMC can request and receive a universally unique identifier, a node number, and a complex descriptor from a connected node.

If there is information available (i.e. a new piece of hardware is being connected to a functioning system), the BMC can begin the self-configuration process. In some embodiments, the BMC can check the connection configuration information to make sure that the available information is accurate by checking the connections described by the descriptors. Such a process can be done by a field programmable gate array (FPGA). All tables can be re-organized/reconfigured based on a new node, however if the connection data is not accurate or complete as illustrated by block 307, the BMC can query local ports using the UUID in a first level search as illustrated by block 308. Also as illustrated by block 307 it can be determined if all tables are matching.

Referring back to decision block 302, if connection information is unavailable or a port cannot be verified, a port is unreachable or no connection is found, the port can be flagged as an un-operable or unconnected port. Accordingly, if there is a mismatch between the complex descriptor and the BMC discovered connections via, e.g., the local port, the system can proceed to conduct a self-configuration as illustrated by block 308. Thus, BMCs in the complex can exchange table data and when BMCs have non-matching table data, BMCs can re-conduct the discovery process.

When all BMCs in the complex determine that they have matching tables then the BMC can perform system partition management. A complex partitioning self-configuration can be performed by each BMC to create the complex descriptors when the system is initially configured or when a connection is added or changed. As illustrated by block 310, each BMC can query all the BMCs connected directly to its ports and can update a local copy of the complex descriptor with a unique identifier such as the UUID.

Each BMC can then perform a "one hop deeper" remote unique identifier query on each port and can capture the remaining unique identifier for any other systems in the system or complex as illustrated by block 310. This hopping inquiry process can produce a complete list of components available to the complex where each BMC or node can be identified by the unique identifier. As illustrated by block 312, each BMC can sort the list of unique identifiers in the complex descriptor. The index number into the sorted unique identifier list can become a unique node number that the BMCs utilize to communicate with specific nodes of the complex.

Each BMC can search the list stored by other BMCs for its own unique identifier and can assign its own node number to the index of the entry. The entry into the table can be associated with the BMC that made the entry. Once node numbers have been self-assigned, BMCs are then capable of sending or receiving messages from any other BMC in the scalable complex, regardless of the setting of partition configuration information. In some embodiments, each BMC can verify the complex descriptors by sending its local port connection table to all the other BMCs. Such sharing of information can ensure consistency in table data. As illustrated by block 314, node numbers can be assigned to each chassis and, as illustrated by block 316, all tables can be updated. The process can end thereafter.

Reference to particular configurations of hardware and/or software, those of skill in the art will realize that embodiments of the present invention may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present invention, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this document that the present disclosure contemplates arrangements for auto-merging processing components. It is understood that the form of the invention shown and described in the detailed description and the drawings are to be taken merely as examples. It is intended that the following claims be interpreted broadly to embrace all the variations of the example embodiments disclosed.

What is claimed is:

1. A method for configuring a descriptor for a complex, wherein a plurality of nodes is available to form the complex and the descriptor of the complex comprises node connection data, the node connection data showing a complete list of connections of ports of the plurality of nodes available to form the complex, the method comprising:
   querying, by each node of the plurality of nodes available to form the complex, ports to request unique identifiers of other nodes of the plurality of nodes available to form the complex;
   storing, by each node of the plurality of nodes available to form the complex, a unique identifier of each node and the unique identifiers of the other nodes of the plurality of nodes available to form the complex;
   determining, by each node of the plurality of nodes available to form the complex, an association of index numbers with each node and each of the other nodes of the plurality of nodes based upon an ordering of the unique identifier of each node and the unique identifiers of the other nodes of the plurality of nodes available to form the complex, to uniquely identify all of the plurality of nodes available to form the complex with the index numbers;
   determining, by each node of the plurality of nodes available to form the complex, a unique index number of the index numbers that is associated with each node by the association;
   querying, by each node of the plurality of nodes available to form the complex, the other nodes of the plurality of nodes to verify at least a portion of the association; and
   receiving, from a port, by each node of the plurality of nodes available to form the complex, the association as determined by another node of the plurality of nodes; and
   reconfiguring a basic input output system (BIOS) of at least one node of the plurality of nodes available to form the complex, based upon the configuration of the descriptor of the complex.

2. The method of claim 1, further comprising transmitting by a node of the plurality of nodes available to form the complex the unique index number in a transmission to identify the node.

3. The method of claim 1, further comprising flagging by a node of the plurality of nodes available to form the complex an unreachable node of the other nodes if the unreachable node fails to respond.

4. The method of claim 1, further comprising determining by a node of the plurality of nodes available to form the complex that a unique identifier of another node of the plurality of nodes available to form the complex, the other node associated with one of the ports, is inaccurate and revising the unique identifier of the other node associated with the one of the ports.

5. The method of claim 1, wherein querying ports by a node of the plurality of nodes available to form the complex comprises querying local ports and querying remote ports, comprising:
   first querying all of the nodes of the plurality of nodes available to form the complex directly connected to ports of the node; and
   afterwards performing a query of remote ports.

6. The method of claim 1, wherein:
   storing the unique identifiers comprises creating by each node of the plurality of nodes available to form the complex a table of the unique identifiers for the node and the other nodes; and
   each table comprises the same unique identifiers arranged in the same ordering.

7. The method of claim 1, wherein determining the association by a node of the plurality of nodes available to form the complex comprises assigning a consecutive index number of the index numbers to each of the unique identifiers based upon the ordering.

8. The method of claim 1, wherein:
   each node of the plurality of nodes available to form the complex comprises a baseboard management controller (BMC); and
   the querying by each node to request unique identifiers, the storing by each node, the determining by each node the association, the determining by each node the unique index number, the querying by each node to verify, and the receiving by each node comprise:
   querying, by the BMC of the node, ports to request unique identifiers of the other nodes of the plurality of nodes available to form the complex;
   storing, by the BMC of the node, the unique identifiers for the other nodes of the plurality of nodes;
   determining, by the BMC of the node, an association of index numbers with the node and each of the other nodes of the plurality of nodes based upon an ordering of the unique identifiers associated with each of the plurality of nodes available to form the complex, to uniquely identify each of the plurality of nodes available to form the complex with the index numbers;

determining, by the BMC of the node, a unique index number of the index numbers that is associated with the node by the association;

querying, by the BMC of the node, the other nodes of the plurality of nodes to verify at least a portion of the association; and receiving, from a port, by each node of the plurality of nodes available to form the complex, the association as determined by another node of the plurality of nodes.

9. The method of claim 1, wherein the querying to verify comprises verifying the node connection data by transmitting a request and receiving a universally unique identifier from another node of the plurality of nodes available to form the complex.

10. An apparatus to configure a descriptor for a complex, wherein the descriptor of the complex comprises node connection data, the node connection data showing a complete list of connections of ports of the plurality of nodes available to form the complex, the apparatus comprising:

for each node of a plurality of nodes available to form the complex:
 a processing component;
 a communication port coupled to the processing component; and
 a controller of the node coupled to the communication port, the controller to query ports via the communication port to request unique identifiers of other nodes available to form the complex; store the unique identifiers for the other nodes; determine an association of index numbers with the node and each of the other nodes based upon an ordering of the unique identifiers associated with each of the nodes, to uniquely identify each of the nodes available to form the complex with the index numbers; determine a unique index number of the index numbers that is associated with the node by the association; query the other nodes for at least a portion of the association; receive the portion of the association via at least one port; and verify the portion of the association as received via the ports; and the apparatus further comprising a BIOS configurer to reconfigure a basic input output system (BIOS) of at least one node of the plurality of nodes available to form the complex, based upon the configuration of the descriptor of the complex.

11. The apparatus of claim 10, further comprising a sorter to sort the unique identifiers.

12. The apparatus of claim 10, wherein the controller comprises a compare module to compare local port connections from the other nodes with at least a portion of the complex descriptor.

13. The apparatus of claim 10, wherein the controller comprises a baseboard management controller.

14. For each node of a plurality of nodes available to form a processing complex, a non-transitory machine-readable storage medium containing instructions to configure a complex descriptor to form the processing complex, wherein:

the complex descriptor comprises node connection data, the node connection data showing a complete list of connections of ports of the plurality of nodes available to form the complex; and when the instructions are executed by a machine, the instructions cause said machine to perform operations, comprising:
 communicating by the node with at least one other node in the processing complex;
 receiving, by the node, connection data from the at least one other node, the connection data comprising at least one unique identifier from the at least one other node;
 determining, by the node, an association of index numbers with the node and the at least one other node based upon an ordering of the unique identifiers associated with each of the nodes, to uniquely identify each of the nodes in the complex with the index numbers;
 determining, by the node, a unique index number of the index numbers that is associated with the node by the association;
 querying the at least one other node for at least a portion of the connection data;
 receiving, by the node, the portion of the connection data; and
 verifying, by the node, the portion of the connection data; and wherein the non-transitory machine-readable storage medium of at least one node of the plurality of nodes available to form the processing complex contains instructions to reconfigure a basic input output system (BIOS) of at least one node of the plurality of nodes available to form the complex, based upon the configuration of the descriptor of the complex.

15. The non-transitory machine readable storage medium of a node of the plurality of nodes available to form a processing complex of claim 14, wherein the querying comprises verifying the connection data by transmitting a request for the at least one unique identifier.

16. The non-transitory machine readable storage medium of a node of the plurality of nodes available to form a processing complex of claim 14, wherein the determining the association comprises associating a second index number of the index numbers with the at least one unique identifier associated with the at least one other node.

17. The non-transitory machine readable storage medium of a node of the plurality of nodes available to form a processing complex of claim 16, wherein the operations further comprise transmitting a communication utilizing the unique index number.

18. The non-transitory machine readable storage medium of a node of the plurality of nodes available to form a processing complex of claim 14, wherein the operations further comprise flagging connection data that is unverifiable.

* * * * *